(12) United States Patent
Martineau

(10) Patent No.: US 8,981,882 B2
(45) Date of Patent: Mar. 17, 2015

(54) ELECTRONIC SWITCH AND COMMUNICATION DEVICE INCLUDING SUCH A SWITCH

(75) Inventor: Baudouin Martineau, Tencin (FR)

(73) Assignee: STMicroelectronics SA, Montrouge (FR)

( * ) Notice: Subject to any disclaimer, the term of this patent is extended or adjusted under 35 U.S.C. 154(b) by 746 days.

(21) Appl. No.: 13/243,824

(22) Filed: Sep. 23, 2011

(65) Prior Publication Data
US 2012/0157011 A1    Jun. 21, 2012

(30) Foreign Application Priority Data
Dec. 21, 2010    (FR) ...................................... 10 60981

(51) Int. Cl.
*H01H 51/22*    (2006.01)
*H04B 1/48*    (2006.01)
*H04B 1/44*    (2006.01)

(52) U.S. Cl.
CPC ... *H04B 1/48* (2013.01); *H04B 1/44* (2013.01)
USPC .............................................. 335/78; 335/80

(58) Field of Classification Search
USPC ............................................................. 335/78
See application file for complete search history.

(56) References Cited

U.S. PATENT DOCUMENTS

| 3,078,395 | A | * | 2/1963 | Fraipont ........................ 361/167 |
| 3,441,865 | A | * | 4/1969 | Siwko ............................ 330/305 |
| 3,515,942 | A | * | 6/1970 | Gordon ............................ 361/49 |
| 3,571,722 | A | | 3/1971 | Vendelin |
| 3,611,101 | A | * | 10/1971 | Kiffmeyer et al. ............. 318/594 |
| 4,042,887 | A | * | 8/1977 | Mead et al. ...................... 330/53 |
| 4,051,475 | A | * | 9/1977 | Campbell ..................... 370/278 |
| 4,187,460 | A | * | 2/1980 | Dauge et al. .................... 324/678 |
| 4,430,758 | A | * | 2/1984 | Snyder ........................... 455/227 |
| 4,602,309 | A | * | 7/1986 | Gaude ............................ 361/210 |
| 4,669,038 | A | * | 5/1987 | Whitford ......................... 363/25 |
| 4,675,911 | A | * | 6/1987 | Sokolov et al. ................ 455/325 |
| 4,890,069 | A | * | 12/1989 | Duffalo et al. ................. 330/277 |
| 4,896,349 | A | * | 1/1990 | Kubo et al. ............... 379/106.03 |

(Continued)

FOREIGN PATENT DOCUMENTS

| DE | 2616185 A1 | 10/1977 |
| EP | 0893882 A2 | 1/1999 |

(Continued)

OTHER PUBLICATIONS

French Search report dated Jul. 27, 2011 from corresponding French Application No. 10/60981.

*Primary Examiner* — Shawki S Ismail
*Assistant Examiner* — Lisa Homza
(74) *Attorney, Agent, or Firm* — Allen, Dyer, Doppelt, Milbrath & Gilchrist, P.A.

(57) ABSTRACT

Switch including a terminal of a first type and at least two terminals of a second type, and a number of circuits capable of ensuring exclusive connection of one of the terminals of the second type to the terminal of the first type as a function of a set of control orders wherein the terminal of the first type is connected to a common point by a first circuit; each terminal of the second type is connected to the common point by a second circuit, with each second circuit including a portion that is magnetically coupled to the first circuit, a static switch mounted in parallel with the portion and capable of being controlled in the "off" state in order to connect the terminal of the first type to the terminal of the second type associated with the second circuit in question.

20 Claims, 2 Drawing Sheets

(56) References Cited

U.S. PATENT DOCUMENTS

| | | | | |
|---|---|---|---|---|
| 5,020,148 A * | 5/1991 | Bonato | | 455/302 |
| 5,054,114 A * | 10/1991 | Erickson | | 455/78 |
| 5,233,317 A * | 8/1993 | Snodgrass et al. | | 333/81 A |
| 5,315,265 A * | 5/1994 | Wisherd et al. | | 330/277 |
| 5,361,409 A * | 11/1994 | Vice | | 455/326 |
| 5,448,771 A * | 9/1995 | Klomsdorf et al. | | 455/126 |
| 5,726,870 A * | 3/1998 | Lavieville et al. | | 363/62 |
| 5,752,181 A * | 5/1998 | Vice | | 455/326 |
| 5,841,467 A * | 11/1998 | Davidson | | 725/148 |
| 6,002,920 A * | 12/1999 | Consolazio et al. | | 455/82 |
| 6,204,737 B1 * | 3/2001 | Ella | | 333/187 |
| 6,466,094 B2 * | 10/2002 | Leighton et al. | | 330/302 |
| 6,788,163 B2 * | 9/2004 | Benham et al. | | 333/24 R |
| 6,809,579 B2 * | 10/2004 | Vandewege | | 327/544 |
| 6,822,531 B2 * | 11/2004 | Carlson | | 333/104 |
| 6,871,059 B1 * | 3/2005 | Piro et al. | | 455/333 |
| 6,882,829 B2 * | 4/2005 | Mostov et al. | | 455/83 |
| 6,922,115 B2 * | 7/2005 | Chaki | | 333/81 A |
| 6,957,055 B2 * | 10/2005 | Gamliel | | 455/323 |
| 6,989,705 B2 * | 1/2006 | Behzad | | 327/359 |
| 7,061,344 B2 * | 6/2006 | Lee et al. | | 333/103 |
| 7,345,521 B2 * | 3/2008 | Takahashi et al. | | 327/308 |
| 7,425,876 B2 * | 9/2008 | Ogawa et al. | | 333/103 |
| 7,564,303 B2 * | 7/2009 | Perugupalli et al. | | 330/66 |
| 7,692,514 B2 * | 4/2010 | LeToux | | 333/101 |
| 7,848,712 B2 * | 12/2010 | Fu et al. | | 455/80 |
| 7,962,105 B2 * | 6/2011 | Sato et al. | | 455/78 |
| 8,103,221 B2 * | 1/2012 | Ta et al. | | 455/81 |
| 8,135,357 B1 * | 3/2012 | Chang et al. | | 455/83 |
| 8,368,481 B2 * | 2/2013 | Jin et al. | | 333/25 |
| 8,416,032 B2 * | 4/2013 | Tsukahara | | 333/101 |
| 8,577,305 B1 * | 11/2013 | Rossi et al. | | 455/76 |
| 2002/0067226 A1 * | 6/2002 | Iguchi | | 333/174 |
| 2002/0125955 A1 * | 9/2002 | Leighton et al. | | 330/302 |
| 2005/0026571 A1 * | 2/2005 | Yang et al. | | 455/78 |
| 2006/0049892 A1 * | 3/2006 | Lee et al. | | 333/101 |
| 2009/0298443 A1 * | 12/2009 | Ta et al. | | 455/83 |
| 2010/0271086 A1 * | 10/2010 | Bao et al. | | 327/144 |
| 2012/0157011 A1 * | 6/2012 | Martineau | | 455/78 |

FOREIGN PATENT DOCUMENTS

| | | |
|---|---|---|
| WO | WO 2006035531 A1 | 4/2006 |
| WO | WO 2008063534 A2 | 5/2008 |

* cited by examiner

ELECTRONIC SWITCH AND COMMUNICATION DEVICE INCLUDING SUCH A SWITCH

CROSS REFERENCE TO RELATED APPLICATIONS

This application is a translation of and claims the priority benefit of French patent application number 10/60981, filed on Dec. 21, 2010, entitled "Electronic switch, and device including such a switch" which is hereby incorporated by reference to the maximum extent allowable by law.

BACKGROUND OF THE INVENTION

1. Field of the Invention

The invention relates to the field of microelectronics. It relates more especially to a switch structure which may have a particular, but not limitative, application for use in radio communication devices such as cell phones or other phones.

2. Discussion of the Related Art

Switches used in the field of microelectronics have large-scale applications in radio communication devices and, in particular, in transmit/receive devices that use a common antenna.

Single Pole Double Throw (SPDT) switches in particular stand out—an example of one of these is shown in FIG. 1. Such a device 1 is designed to connect the transmit/receive antenna connected to terminal 2 alternately to the transmit chain or receive chain that are connected to terminals 3, 4.

In the form illustrated in FIG. 1, this switching is obtained by applying two control signals 5, 6 which are applied to static switches that are shown in FIG. 1 by field effect transistors. These transistors 10, 11, 12, 13 are controlled in such a way that, when one wants to connect transmit chain 3 to antenna 2, transistor 12 is in the "on" state whereas transistor 10 is in the "off" state and, conversely, when transistor 13 is in the "off" state, transistor 11 is in the "on" state, thereby ensuring the receive line is grounded.

Additionally, in order to provide protection against electrostatic discharges, the terminal that is connected to the antenna is equipped with a circuit that comprises two back-to-back diodes 15, 16 which are also connected to ground.

SUMMARY OF THE INVENTION

The Applicant has determined that the presence of various components which ensure configuring of the switch as well as diodes which provide protection against electrostatic discharges are sources of considerable attenuation that affects high-frequency signals. In fact, the transistors and diodes create stray capacitance which becomes more marked the higher the frequency of the signals that pass through the switch is and this frequency is typically higher than several tens of gigahertz.

Also, the Applicant has determined that these components are sources of non-linearity which are problematic in the application of these switches. In fact, the stray capacitance inherent in the junctions in the active components depends in particular on the voltage levels that are applied. These phenomena result in non-linearities which modify the signals that pass through these components and cause spectral compression or spectral spreading for instance. This non-linearity becomes more considerable as the size of the circuits that include the switch is reduced, especially if there is a requirement to incorporate the switch in the amplifier's integrated circuit. This is also critical if the power that is to be handled by the switch is high—which is actually the case with a switch that is located just upstream from the transmit antenna and downstream from the amplifier.

There is therefore a need for switches in which the effect of these non-linearities is limited.

Thus, in one embodiment, the switch comprises a terminal of a first type and at least two terminals of a second type, as well as a number of circuits capable of ensuring exclusive connection of one of the terminals of the second type to the terminal of the first type as a function of a set of control signals.

In this embodiment, the terminal of the first type is connected to a common point by a first circuit. Additionally, each terminal of the second type is connected to this common point by a second circuit. Each of these second circuits comprises a portion that is magnetically coupled to the first circuit and a static switch connected in parallel with this portion and controlled in the "off" state when one wants to connect the terminal of the first type to the terminal of the second type associated with the circuit in question.

Conversely, when this transistor is "on", the portion of the corresponding second circuit is short-circuited and the signals that pass through this terminal are blocked so that the associated terminal of the second type is disconnected from the common terminal.

In one particular embodiment, the magnetic coupling coefficient between the circuit of the first type and each magnetically coupled portion of the circuit of the second type exceeds 0.5 and preferably exceeds 0.7. Such a switch can advantageously be realized inside an integrated circuit.

Various architectures can be envisaged in order to ensure magnetic coupling between the circuit associated with the common terminal and each of the circuits associated with the other terminals. Thus, in a first embodiment, the first circuit and the magnetically coupled portions of the second circuits may form loops that are substantially coaxial and may be either superposed and have the same diameter or be concentric and coplanar but have different diameters.

In another embodiment, the magnetically coupled portions may be formed by lines that are substantially straight and parallel.

In another embodiment the number of static switches needed to ensure configuring of the switch is halved compared with solutions according to the prior art, especially that described in FIG. 1, so that there are fewer sources of non-linearity and the overall behavior of the switch is more linear.

Add to this the fact that the two diodes that provide protection against electrostatic discharges are no longer present and no longer necessary. However, in certain applications that are likely to operate at high voltage levels, such diodes may nevertheless be employed.

As already mentioned, such a switch can advantageously be fitted in a radio communication device in which the switch's terminal of the first type is connected to the transmit/receive antenna whereas the other terminals are connected to the receiver and/or transmit chains.

BRIEF DESCRIPTION OF THE DRAWINGS

Certain aspects of the invention as well as its resulting advantages will be more readily understood from the descriptions of the following embodiments, given merely by way of example and not limitatively, making reference to the accompanying drawings in which.

DETAILED DESCRIPTION

Figure 2:
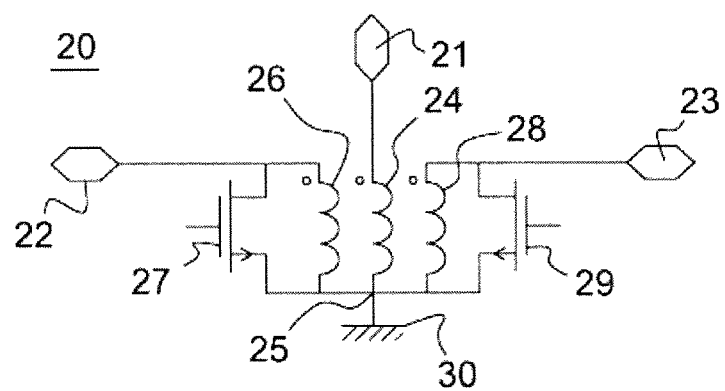
FIG. 2 is a schematic circuit diagram showing the structure of a switch according to a first embodiment.

Switch 20 shown in FIG. 2 has a terminal 21 of a first type that will be connected, depending on the configuration of the switch, to either terminal 22 or 23. Terminal 21 is connected to a common point 25 which is itself connected to ground 30 via a conductor 24 which may be an inductive conductor.

The two terminals of the second type 22, 23 are connected to the same common point 25, each via a circuit comprising a conductor 26, 28 that is also inductive and in parallel with which a transistor 27, 29 is mounted.

More precisely, inductive conductors 26, 28 are magnetically coupled to conductor 24 in various possible ways that will be described later. This magnetic coupling allows the current that flows in one of conductors 26, 28 to induce a proportional current in conductor 24 and vice versa.

Note that magnetic coupling is not necessarily complete and that there may be magnetic leakage due to the geometrical configuration of the coupled conductors. Nevertheless, this leakage, if it does exist, has a linear behavior and this is a major advantage compared with solutions according to the prior art.

Figure 1:
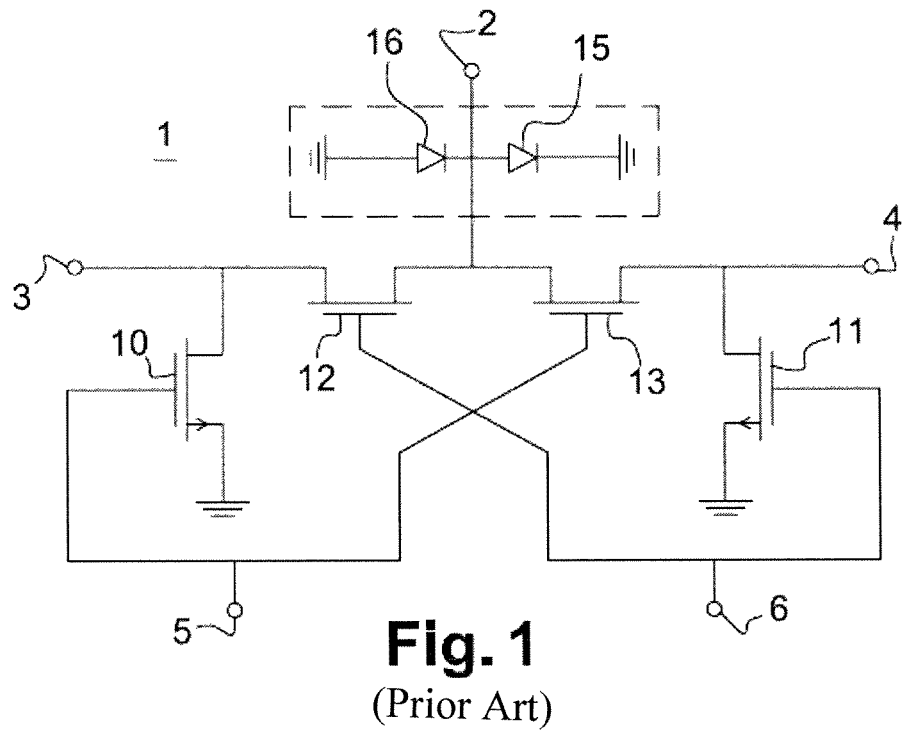
FIG. 1 is a schematic circuit diagram showing the structure of a switch according to the prior art.

In fact, in this switch, the number of active components such as transistors, is reduced because, in the embodiment illustrated, every terminal of the second type only comprises a single transistor compared with the solution according to the prior art illustrated in FIG. 1 which comprises two transistors per equivalent terminal.

This reduction in the number of active components which are sources of non-linearity is therefore a significant advantage. In addition, to the extent that terminal 21 of the first type on which electrostatic discharges may occur is grounded via conductor 24, the risks to other parts of the switch and to circuits connected to the terminals of the second type due to possible electrostatic discharges are reduced, despite the absence of the diodes that are connected to ground.

The operation of switch 20 can be summed up as follows. When one wants to connect the circuit connected to terminal 22 to common terminal 21, transistor 27 is controlled in the "off" state whereas transistor 29 which is connected to terminal 23 is "on". This way, the circuit connected to terminal 23 is grounded and the voltage across the terminals of inductive conductor 28 is zero. Additionally, the signals from terminal 22 produce a current in inductive conductor 26 which, in turn, induces a current in inductive conductor 24 which is connected to common terminal 21. The current that flows in this inductive conductor is proportional to the current which flows via terminal 22, depending on the characteristics of the magnetic coupling between conductors 24 and 26.

Conversely, when one wants to connect terminal 23 to common terminal 21, transistor 29 is controlled in the "off" state, whereas transistor 27 which is associated with the other terminal 22 is "on". Operation is therefore symmetrical. Note that the control signals for static switches 27, 29 are opposite in order to ensure exclusive connection of one or other of the terminals of the second type 22, 23. Obviously, such a layout can easily be extended to include a larger number of such terminals of the second type. To do this, it is sufficient to add equal numbers of inductive conductors and additional terminals, each of these inductive conductors being coupled to the inductive conductor that is connected to the common terminal. Each of these additional inductive conductors also comprises a static switch connected in parallel which is in the "off" state when the terminal to which it is connected should be connected to the common terminal and is in the "on" state in all other cases.

Obviously, the type and number of static switches can be adapted depending on operating conditions and, in particular, the voltage and current levels that are used. It is thus possible to use several static switches, connected in series or in parallel, to the terminals of one of the inductive conductors if the voltage or current level so requires.

Figure 3:
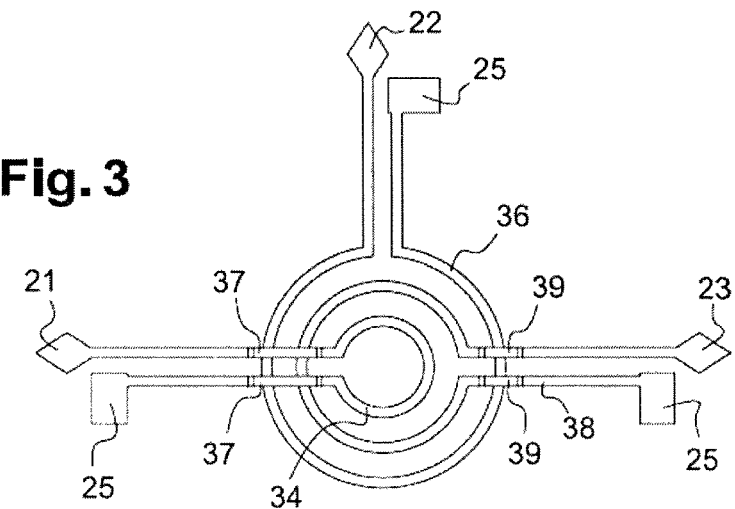
FIG. 3 is a schematic circuit diagram showing one particular embodiment in terms of the magnetic coupling of the circuits involved in the switch according to a first embodiment.
Figure 4:
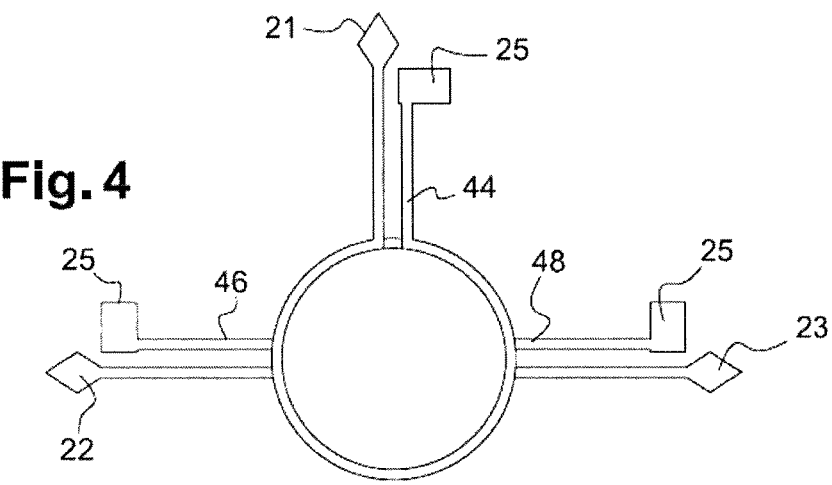
FIG. 4 is a schematic circuit diagram showing one particular embodiment in terms of the magnetic coupling of the circuits involved in the switch according to an alternative embodiment.

In practice, the coupled inductive conductors can be realized in different ways and several examples of this are shown in FIGS. 3 and 4. As shown in FIG. 3, the three inductive conductors can have substantially circular or polygonal loop shapes. Conductors 34, 36 and 38 can thus be realized in the same plane and have a concentric configuration with each conductor having a specific diameter. It is then necessary to realize portions 37, 39 which provide bridges to allow the terminals of conductors 36, 34 to be connected beyond the diameter of conductors 34, 38 which are externally located. To make things easier to understand, the ends of conductors 34, 36 and 38 are given the same references as the terminals or circuit points in FIG. 2 to which they are connected.

In order to optimize magnetic coupling in the case of a switch that comprises three terminals, inductive conductor 34 which is connected to the common terminal has an intermediate diameter compared with the two other inductive conductors 36, 38.

Another architecture can be used, as shown in FIG. 4, wherein the three inductive conductors 44, 46 and 48, which still have a circular or polygonal shape, are superposed, thereby improving magnetic coupling but requiring the use of several levels of deposited metal. To make things easier to understand, the ends of conductors 44, 46 and 48 are given the same references as the terminals or circuit points in FIG. 2 to which they are connected.

Figure 5:
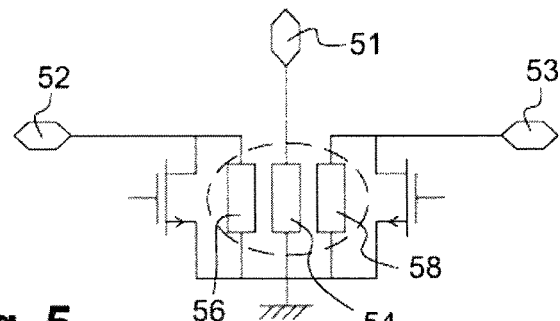
FIG. 5 is a schematic circuit diagram showing the structure of a switch according to another embodiment.

Magnetic coupling between the various conductors associated with the terminals of the switch can also be realized as shown in FIG. 5 by inductive coupling between linear conductors 54, 56, 58. In this case, the coupled conductors 54, 56, 58 can be in the form of transmission lines (e.g. microstrips) that are arranged in the same plane and are parallel or even superposed, but in different planes.

The coupling coefficient between the lines can be adapted by modifying the spacing between the conductors. This spacing depends on the positioning of the conductors inside the component, taking into account also the series resistance of the conductor which should be as small as possible and therefore requires a sufficient thickness on the conductor and this has an effect on conductor spacings.

The switch described above is obviously of particular interest for integration in radio communication devices in which various transmit and receive circuits share a common antenna. It is also possible to use this switch for more complex systems which include several receive and/or transmit chains in accordance with separate communication standards and protocols. Such a switch thus has major advantages in terms of radio frequency losses and linear performance.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A switch comprising:
a terminal of a first type and at least two terminals of a second type, and a number of circuits capable of ensuring exclusive connection of one of the terminals of the second type to the terminal of the first type as a function of a set of control signals wherein
the terminal of the first type is connected to a common point by a first circuit;
each terminal of the second type is connected to said common point by a second circuit, with each second circuit comprising
a portion that is magnetically coupled to said first circuit, and
a static switch mounted in parallel with said portion and capable of being controlled in an off state in order to connect the terminal of the first type to the terminal of the second type associated with the second circuit in question.

2. The switch as claimed in claim 1 wherein a coupling coefficient between the first circuit and the magnetically coupled portion of each second circuit exceeds 0.5.

3. The switch as claimed in claim 2 wherein the coupling coefficient between the first circuit and the magnetically coupled portion of each second circuit exceeds 0.7.

4. The switch as claimed in claim 1 wherein the first circuit and the magnetically coupled portions of the second circuits form substantially coaxial loops.

5. The switch as claimed in claim 4 wherein the first circuit and the magnetically coupled portions of the second circuits form substantially superposed loops.

6. The switch as claimed in claim 1 wherein the first circuit and the magnetically coupled portions of the second circuits form substantially concentric loops that are located in a same plane.

7. The switch as claimed in claim 1 wherein the first circuit and the magnetically coupled portions of the second circuits form substantially straight, parallel lines.

8. The switch as claimed in claim 1 wherein a pair of back-to-back diodes connect the terminal of the first type and the common point.

9. A communication device comprising:
an antenna, at least one receive chain and at least one transmit chain; and
a switch comprising
a first inductive element coupled between a first terminal and a reference terminal,
a second inductive element coupled between a second terminal and the reference terminal and magnetically coupled to the first inductive element,
a first switching element coupled in parallel with the second inductive element,
a third inductive element coupled between a third terminal and the reference terminal and magnetically coupled to the first inductive element, and
a second switching element coupled in parallel with the third inductive element;
wherein the antenna is coupled to the terminal of the first type and said receive and transmit chains are each connected to one of the terminals of the second type.

10. A switch comprising:
a first inductive element coupled between a first terminal and a reference terminal;
a second inductive element coupled between a second terminal and the reference terminal and magnetically coupled to the first inductive element;
a first switching element coupled in parallel with the second inductive element;
a third inductive element coupled between a third terminal and the reference terminal and magnetically coupled to the first inductive element; and
a second switching element coupled in parallel with the third inductive element.

11. A switch as defined in claim 10, wherein the second terminal is coupled to the first terminal in response to the first switching element being in an off state and the second switching element being in an on state.

12. A switch as defined in claim 10, wherein the third terminal is coupled to the first terminal in response to the first switching element being in an on state and the second switching element being in an off state.

13. A switch as defined in claim 10, wherein the first and second switching elements comprise transistors.

14. A switch as defined in claim 10, wherein the first, second and third inductive elements comprise coaxial conductive loops formed on a substrate.

15. A switch as defined in claim 14, wherein the coaxial conductive loops are formed on one level and have different diameters.

16. A switch as defined in claim 14, wherein the coaxial conductive loops are formed on different levels and have equal diameters.

17. A switch as defined in claim 10, wherein the first, second and third inductive elements comprise parallel conductive lines formed on a substrate.

18. A switch as defined in claim 10, wherein a coupling coefficient between the first inductive element and each of the second and third inductive elements exceeds 0.5.

19. A switch as defined in claim 10, wherein a coupling coefficient between the first inductive element and each of the second and third inductive elements exceeds 0.7.

20. A method for switching electronic signals comprising:
providing a switch including a first inductive element coupled between a first terminal and a reference terminal, a second inductive element coupled between a second terminal and the reference terminal and magnetically coupled to the first inductive element, a first switching element coupled in parallel with the second inductive element, a third inductive element coupled between a third terminal and the reference terminal and magnetically coupled to the first inductive element, and a second switching element coupled in parallel with the third inductive element;
connecting the second terminal to the first terminal in response to controlling the first switching element in an off state and controlling the second switching element in an on state; and
connecting the third terminal to the first terminal in response to controlling the first switching element in the on state and controlling the second switching element in the off state.

* * * * *